United States Patent [19]

Laqua et al.

[11] 4,198,332
[45] Apr. 15, 1980

[54] PROCESS FOR THE PREPARATION OF SOLUTIONS OF UREA-FORMALDEHYDE RESINS FOR THE IMPREGNATION AND COATING OF CARRIER WEBS FOR COATING THE SURFACE OF WOOD-BASED PANELS

[75] Inventors: Arnold Laqua; Ulrich Holtschmidt; Eckehard Schamberg, all of Essen; Dieter Hellwig, Bochum, all of Fed. Rep. of Germany

[73] Assignee: Th. Goldschmidt AG, Essen, Fed. Rep. of Germany

[21] Appl. No.: 949,113

[22] Filed: Oct. 6, 1978

[51] Int. Cl.² .................... C08L 61/24; B32B 23/08; B32B 27/10
[52] U.S. Cl. ............... 260/29.4 UA; 428/219; 428/530; 525/158
[58] Field of Search ............... 260/29.4 UA, 851; 428/219, 530

[56] References Cited

U.S. PATENT DOCUMENTS

| | | | |
|---|---|---|---|
| 3,350,329 | 10/1967 | Scholl | 260/29.4 R |
| 4,113,701 | 9/1978 | Laqua et al. | 260/29.4 R |

*Primary Examiner*—Theodore E. Pertilla
*Attorney, Agent, or Firm*—Toren, McGeady and Stanger

[57] ABSTRACT

A method for the preparation of hardenable urea-formaldehyde resins for use in impregnating and coating carrier webs wherein urea and formaldehyde are first reacted in the presence of an aminosulfonic acid and ammonia, additional aminosulfonic acid is added and the mixture is further reacted to adjust the viscosity of the solution and then additional ammonia and urea are added to the reaction mixture and the mixture is further reacted to adjust the viscosity thereof, and wherein a polymer formed from the monomers of the formula

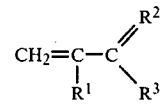

in which
$R^1 = H$ or $CH_3$,
$R^2 = O$,
$R^3 = OH$, $NH_2$, $OC_nH_{2n+1}$ wherein n is a whole number from 1 to 4, $OC_mH_{2m}OH$ wherein m is a whole number from 1 to 6, or $OC_mH_{2m}OC_nH_{2n+1}$, or
$R^2$ and $R^3$ are both N, is added in the form of an emulsion or dispersion.

The product obtained by this process is particularly useful for coating wood-based panels in both short-cycle as well as multi-daylight presses.

6 Claims, No Drawings

PROCESS FOR THE PREPARATION OF SOLUTIONS OF UREA-FORMALDEHYDE RESINS FOR THE IMPREGNATION AND COATING OF CARRIER WEBS FOR COATING THE SURFACE OF WOOD-BASED PANELS

BACKGROUND OF THE INVENTION

1. Field of the Invention

The invention relates to a process for the preparation of solutions of hardenable urea-formaldehyde resins for impregnating and coating carrier webs to be used in coating the surface of wood-based panels.

2. Description of the Prior Art

German Offenlegungsschrift No. 24 48 472 discloses a process for the preparation of solutions of hardenable urea-formaldehyde resins which are especially useful for impregnating and coating carrier webs to be used in coating the surface of wood-based panels. The process comprises the following steps:

(a) reacting an aqueous solution of urea and formaldehyde in a molar ratio of 1:1.5 to 2.5 and in the presence of 0.2 to 1.0 mmoles of an aminosulfonic acid and 20 to 100 mmoles of ammonia or 5 to 25 mmoles of urotropine (in each case based on 1 mole of urea) for 10 to 30 minutes at temperatures of 70° to 95° C., until the 50% solution has a viscosity of 55 to 65 cps at 20° C., and then (b) adding 0.8 to 10 mmoles of an aminosulfonic acid to the mixture and maintaining the pH at a value between 4.0 and 4.5 with ammonia during a reaction time of 10 to 25 minutes at 70° to 95° C. until the 50% solution has a viscosity of 80 to 110 cps at 20° C., and finally (c) adding 40 to 200 mmoles of ammonia or 10 to 50 mmoles of urotropine as well as 0.1 to 0.3 moles of urea to this reaction product and reacting this mixture for 5 to 45 minutes at a temperature of 70° to 95° C., until the 50% solution has a viscosity of 85 to 125 cps at a temperature of 20° C.

Carrier webs impregnated and coated with such urea-formaldehyde resins have proven themselves particularly useful for coating wood-based panels. This is the case especially when wood-based panels are coated in so-called short-cycle presses, i.e., in presses at a pressure of up to 2000 kPa which is about 20 kg/cm$^2$, using platten temperatures of 160° to 180° C. for a period of ca. 60 to 180 seconds which conditions are effective to achieve the desired coating.

In many cases, especially when the formation of particularly high-grade surfaces is desired, the coating of the wood-based panels takes place in multi-daylight presses at the same pressure, at a temperature of about 130° to 150° C. and during a period of 2 to 6 minutes with subsequent cooling. With this procedure, it was noted that surfaces which are susceptible to cracking are often formed as a result of the longer action of heat.

If the hardener content is reduced in order to eliminate such defects, the danger exists that, under the conditions of the short-cycle presses, the resins will not be fully cured. Accordingly, it was necessary to match the hardening characteristics to the respective hardening conditions by adding a larger amount of hardening catalyst to those impregnated and coated carrier webs which were processed under short-cycle conditions. The manufacturer was therefore forced to keep supplies of carrier webs on hand which had been impregnated and coated with different resins in order to accommodate the requirements of the pressing conditions under which the surfaces are coated.

SUMMARY OF THE INVENTION

We have discovered a modification of the resin as described in German Offenlegungsschrift No. 24 48 472 and a method for preparation thereof, said modified resin possessing excellent use properties so that it is suitable for the manufacture of coating webs which may be processed in short-cycle presses as well as in multi-daylight presses.

This resin is prepared by adding to the reaction mixture in step (a) 1 to 10 weight percent, preferably 1 to 5 weight percent, and most preferably 2 to 4 weight percent, based on the solid resin, of a polymer in the form of an emulsion or a suspension, the polymer being formed from monomers of the general formula

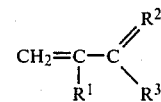

in which
$R^1 =$ H or CH$_3$,
$R^2 =$ O,
$R^3 =$ OH, NH$_2$, OC$_n$H$_{2n+1}$ (n is a whole number from 1 to 4), OC$_m$H$_{2m}$OH (m is a whole number from 1 to 6) or OC$_m$H$_{2m}$OC$_n$H$_{2n+1}$, or
$R^2$ and $R^3$ are both N.

DESCRIPTION OF THE PREFERRED EMBODIMENTS

In compounds of the above formula, if $R^1$ is H, the compounds are acrylic compounds and if $R^1$ is CH$_3$, they are methacrylic compounds. Depending on the other substituents represented by $R^2$ and $R^3$, the polymer is obtained by polymerizing acrylic acid, acrylamide, esters of acrylic acid, esters of hydroxyacrylic acid, alkyl ethers of acrylic acid, acrylonitrile, the corresponding methacrylic compounds or mixtures of the above-mentioned polymers.

Admittedly, it is well known that an elastifying effect may be achieved by the addition of more than 20 weight percent of high-molecular weight thermoplasts to aminoplast resins (Knuststoff-Rundschau 13(7), pages 349 to 359, 1969).

It was, however, surprising that the addition of such small amounts of less than 10 weight percent, which have no effect on the other properties of the urea resin, is sufficient to bring about the desired modification of the urea resin so that, when it is applied to carrier webs, it can be hardened in short-cycle presses as well as in multi-daylight presses to achieve optimum surfaces.

It is furthermore surprising that the addition of thermoplasts in amounts of ca. 4% based on the solid resin, leads to optimum properties and that some properties, especially the hardening as measured by the attack of 0.1 N HCl and the development of the surface deteriorate again at higher additions of thermoplast. At additions of thermoplast above 10 weight percent, the resin is definitely observed to be cloudy so that such resins can no longer be used as transparent coatings.

Surprisingly, surfaces prepared using such resins exhibit definitive improvements in regard to their acid and water resistance. A process is described in German Offenlegungsschrift No. 22 22 401 in which a carrier web, impregnated with an aminoplast resin, is coated with a mixture which consists of aminoplast resin and an acrylic ester dispersion. After hardening on a wood-based panel, the surface of this product no longer retains, to the full extent, the properties of the hardening aminoplast resin. Thus, the interfering thermoplastic properties of the polymer begin to be dominant.

German Offenlegungsschrift No. 25 36 978 also describes a modifying agent for melamine-formaldehyde resins. The use of a mixture, in amounts of 2 to 12 weight percent based on the solid resin, and consisting of 60 to 70 weight percent of water-soluble monoalkyl or monoaryl ethers of alkylene glycols or polyalkylene glycols and 25 to 40 weight percent of a mixture of
  (a) hydroxyalkyl esters of acrylic and/or methacrylic acid and
  (b) their polymers, the weight ratio of (a):(b) being 1:2 to 2:1, the total mixture having a viscosity, measured in a DIN cup (4 mm orifice, 20° C.), of 20 to 50 seconds, is claimed for modifying melamine-formaldehyde resins whose melamine portion may optionally be replaced by up to 50 weight percent of other aminoplast resin formers.

It is noted that a melamine-formaldehyde resin is modified with a mixtuure of alkylene glycol derivatives, monomeric hydroxyalkyl esters of acrylic acid as well as their polymers. The modification of a urea-formaldehyde resin, exclusively with slight amounts of a polymer of the aforementioned acrylic or methacrylic derivatives, however, cannot be derived from the disclosure of the modification of a melamine-formaldehyde resin with such a complex mixture. For this, the end use properties of the urea-formaldehyde resin and the melamine-formaldehyde resin are too different.

Particularly good results are obtained when 1 to 10 weight percent, based on the solid resin, of a sulfonamide of the general formula

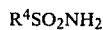

are added to the solution of the hardenable urea-formaldehyde resin.

In this formula, $R^4$ represents an alkyl residue, particularly an alkyl residue with 1 to 12 carbon atoms, and preferably a methyl residue. $R^4$ may also represent a phenyl residue, which may be substituted. In this connection, an alkylaryl residue is preferred in which the alkyl group, particularly the methyl group, is in the para position to the $So_2NH_2$ group. The addition of the sulfonamide preferably takes place in step (a) of the process.

By this modification, the hydrophobizing and elastifying properties of the hardened urea resin are improved even further. This, in turn, leads to a wider tolerance for processing carrier webs, impregnated and coated with this resin.

It is explained in German Offenlegungsschrift No. 24 48 472 that the resin described therein are self-hardening because of the chemically incorporated acids. Their rate of setting can be adjusted at will by additional amounts of hardener. In the case of the purpose of the present invention, namely, the widening of the tolerance under which the resin-impregnated and resin-coated carrier webs can be processed, it has proven to be particularly advantageous to use a compound of the general formula

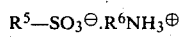

in amounts of 0.1 to 3.0 weight percent based on the solid resin, as a special latent hardener. $R^5$ represents an alkyl residue with especially 1 to 12 carbon atoms, an aryl residue, especially a phenyl residue, which optionally may be substituted, preferably in the para position, with an alkyl residue with 1 to 4 carbon atoms, especially with 1 carbon atom. $R^6$ is a lower alkyl residue with 1 to 4 carbon atoms, especially the methyl residue. Particularly preferred is the use of the methylammonium salt of p-toluenesulfonic acid.

Using the modified resin solution prepared in accordance with the present invention, it is now possible to impregnate and coat carrier webs which can be processed with exceptional versatility by a great number of the technologies in use today. From the points of view of economic and simplified method of manufacture and use, the present invention represents a significant advance in the manufacture of surface-coated wood-based panels.

The present process as well as the urea resins obtained by the process and hardened are described in the following examples.

EXAMPLE 1

Preparation of a Urea Resin Solution

A steam-heated steel kettle equipped with a stirrer is charged with 2,290 kg of a 37% formalin solution and, one after the other, with 9 kg of a 5% aqueous solution of amidosulfonic acid, 40 kg of a 33% urotropine solution, 140 kg of a 50% dispersion of a copolymer of butyl acrylate and acrylamide in a weight ratio of 95:5, 1,058 kg of urea and 140 kg of paratoluenesulfonamide. (It is noted that urotropine is used to supply ammonia since it decomposes to form ammonia and formaldehyde; 1 mole of urotropine supplies 4 moles of ammonia.) The contents of the reactor are brought to a temperature of 95° C. within 15 minutes and kept at this temperature with stirring. The pH value of the solution is about 7.0. After the addition of 26 kg of a 33% urotropine solution, the pH is 7.2. After 15 minutes, the pH has dropped to 6.5 and 10 kg of a 33% urotropine solution are once again added. After a further 10 minutes, the reaction mixture has a viscosity of 60 cps. It is now cooled to 85° C. and 24 kg of a 5% amidosulfonic acid solution are added with stirring. The pH is now 5.2. The temperature is maintained at 85° C. until, after 15 minutes, the reaction mixture has a viscosity of 90 cps. Now, 156 kg of a 33% urotropine solution are added, the pH rising to 7.0. After addition of 148 kg of urea, the reaction is continued for a further 10 minutes at a temperature of 90° C. Subsequently, the product is cooled to room temperature. The resin solution has a pH of 7.2 and a DIN cup viscosity (4 mm orifice, 20° C.) of 16 seconds. The solids content is 58.0%.

Preparation of a Hardener Solution

A 50 liter reactor equipped with a cooling device is charged with 30.8 kg of water, in which 19 kg of p-toluenesulfonic acid are dissolved with stirring. While cooling, 7.8 kg of a 40% solution of monomethylamine are now added stepwise. The reaction mixture has a pH of 9.5. The solution is neutralized with 50% p-toluenesulfonic acid.

Impregnation and Coating of a Carrier Web 1,000 kg of the urea-resin solution are mixed with 20 kg of the hardener solution and 2 kg of a release agent based on mineral oil (100% actives) are added to the mixture. A white pigmented absorbent refined-pulp paper with a weight per unit area of 80 g/m² is treated with resin by known processes in such a manner, that an impregnated and coated paper carrier web results with a final weight of 190 g/m², the resin-treated carrier web containing 6.0% of volatile constituents. In this connection, the content of volatile constituents is the loss in weight, shown by the carrier web impregnated and coated with resin, during a heat treatment of 10 minutes at 160° C.

Coating Chipboards with Resin-Treated Paper Carrier Webs

The resin-treated paper carrier web is used for coating the surface of 16 mm chipboards. Two different procedures were used:

(a) a short-cycle press under the following conditions: 90, 120 and 180 seconds at 160° C. at the platten of the press, 2,000 kPa (ca. 20 kg/cm²) pressure, press caul of chrome-plated brass with a degree of gloss of 40, without after-cooling, and (b) a multi-daylight press under the following conditions: 4 and 6 minutes at 145° C. at the platten of the press, 2,000 kpa (ca. 20 kg/cm²) pressure, press caul of high-gloss chrome-plated brass, after-cooling to 30° C.

The coated chipboards have a closed, uniformly glossy surface.

Testing the Coated Chipboards

For comparison, chipboards were tested which had been coated with resin-treated paper carrier webs in which the resin, described in Example 1 of German Offenlegungsschrift No. 24 48 472 was used as the urea resin representing the state of the art for preparing the resin-treated carrier web.

In Table I below, the acid values were evaluated as follows:

Grade 1 = no loss of gloss
Grade 2 = very slight loss of gloss,
Grade 3 = loss of gloss, associated with incipient detachment of resin,
Grade 4 = severe loss of gloss, clear detachment of resin,
Grade 5 = open paper fibers, high resin removal.

The surfaces, in those cases where the degree of gloss was 40, were evaluated according to criteria, comparable with those used for the surfaces from the high-gloss multi-daylight pressings. The gradings have the following meaning:

Grade 1 = very good
Grade 2 = good
Grade 3 = satisfactory
Grade 4 = adequate
5 = inadequate All further tests were conducted according to DIN 53 799.

TABLE FOR EXAMPLE 1

USE TEST DATE OF AMINOPLAST RESIN COATINGS BASED ON DIN 53 799

1. Short-Cycle Conditions

| Resin-treated Carrier Web | Comparison Resin of German Offenlegungs-Schrift 24 48 472 Example 1 | | | Inventive Product of the Process | | |
|---|---|---|---|---|---|---|
| Pressing time in seconds | 90 | 120 | 180 | 90 | 120 | 180 |
| Acid value (0.1N HCl) | 4 | 3–4 | 3 | 2 | 1 | 1 |
| Surface grade (degree of gloss 40) | 5 | 4 | 3 | 2–3 | 2 | 1–2 |
| Tear susceptibility (evaluation accord. to DIN 53 799) | 1 | 2 | 2 | 0 | 0 | 0 |
| Wear/100 revolutions (mg) | 73 | 71 | 63 | 73 | 71 | 61 |
| Behavior towards: | | | | | | |
| Water vapor | severe loss of gloss | average loss of gloss | slight loss of gloss | slight loss of gloss | very slight loss of gloss | almost no loss of gloss |
| Glowing cigarette | brown discoloration w. blisters | slight brown discoloration with blisters | slight brown discoloration with blisters | brown discoloration | slight brown discoloration | slight brown discoloration |
| Hot pots | slight loss of gloss | slight loss of gloss | very slight loss of gloss | very slight loss of gloss | very slight loss of gloss | very slight loss of gloss |
| Oil; ethanol (50%) | nothing | nothing | nothing | nothing | nothing | nothing |
| Lemonade | abnormal was discovered | abnormal was discovered | abnormal was discovered | abnormal was discovered | abnormal was discovered | abnormal was discovered |
| Citric acid (saturated) | slight attack | slight attack | slight attack | nothing abnormal was discovered | nothing abnormal was discovered | nothing abnormal was discovered |
| Acetic acid (10%) | slight attack | nothing abnormal was discovered | nothing abnormal was discovered | nothing abnormal was discovered | nothing abnormal was discovered | nothing abnormal was discovered |
| Lactic acid (80%) | average attack | slight attack | nothing abnormal was discovered | nothing abnormal was discovered | nothing abnormal was discovered | nothing abnormal was discovered |
| Tartaric acid (saturated) | slight | slight | slight | nothing | nothing | nothing |

TABLE FOR EXAMPLE 1-continued

| | | | | | | |
|---|---|---|---|---|---|---|
| | attack | attack | attack | abnormal was discovered | abnormal was discovered | abnormal was discovered |
| $Na_2CO_3$ (5%) | slight attack | slight attack | nothing abnormal was discovered | nothing abnormal was discovered | nothing abnormal was discovered | nothing abnormal was discovered |
| Tea | slight attack | slight attack | slight attack | nothing abnormal was discovered | nothing abnormal was discovered | nothing abnormal was discovered |
| Phenol (5%) | slight attack | slight attack | nothing abnormal was discovered | nothing abnormal was discovered | nothing abnormal was discovered | nothing abnormal was discovered |
| $NH_4OH$ | slight attack | slight attack | slight attack | nothing abnormal was discovered | nothing abnormal was discovered | nothing abnormal was discovered |
| Coffee, Mustard; Lipstick; Shoe Polish; Nail Polish, Fruit Juice | nothing abnormal was discovered | nothing abnormal was discovered | nothing abnormal was discovered | nothing abnormal was discovered | nothing abnormal was discovered | nothing abnormal was discovered |

2. Multi-Daylight Press Conditions

| Resin-treated Carrier Web | Process Product German Offenlegungsschrift 24 48 472 (Example 1) | | Inventive Process Product | |
|---|---|---|---|---|
| Pressing time in minutes | 4 | 6 | 4 | 6 |
| Acid value (0.1N HCl) | 4–5 | 4–5 | 2 | 1–2 |
| Surface grade (high gloss) | 4 | 4 | 1 | 1 |
| Tear susceptibility (evaluation according to DIN 53 799) | 1 | 2 | 0 | 0 |
| Behavior towards: | | | | |
| Water vapor | very severe attack | slight attack | very slight attack | almost no attack |

EXAMPLE 2

Comparison Example without the Use of Hardener of the present Invention 100 parts by weight of the urea-formaldehyde resin prepared in Example 1 are intimately mixed with 2 parts of a 50% solution of the triethanol ammonium salt of p-toluenesulfonic acid as a hardener representing the state of the art and 2 parts of a release agent based on mineral oil (100% actives). A carrier web of white pigmented, absorbent, refined-pulp paper with a weight per unit area of 80 g/m² is treated with the resin by known procedures so that a resin-treated carrier web results with a final weight of 190 g/m² and with a 6.5% content of volatile constituents.

The resin-treated paper carrier web is used for coating a chipboard in a short-cylce press and is compared with the surface of a chipboard which has been coated with a resin-treated paper carrier web, using the hardener solution as prepared in Example 1.

TABLE FOR EXAMPLE 2

| | Hardener Triethanol ammonium salt of p-toluenesulfonic acid (state of the art) (2 parts of a 50% solution) | | | Hardener Methyl ammonium salt of p-toluenesulfonic acid (present invention) (2 parts of a 50% solution) | | |
|---|---|---|---|---|---|---|
| Pressing time in seconds | 90 | 120 | 180 | 90 | 120 | 180 |
| Acid value (0.1N HCl) | 3 | 2–3 | 2–3 | 2 | 1 | 1 |
| Surface grade (degree of gloss 40) | 3–4 | 3 | 3 | 2–3 | 2 | 1–2 |
| Tear susceptibility (evaluation according to DIN 53 799 | 0 | 0 | 0 | 0 | 0 | 0 |
| Behavior towards: | | | | | | |
| Water vapor | very severe attack (raised paper fiber) | very severe attack (raised paper fiber) | very severe attack (raised paper fiber) | slight loss of gloss | very slight loss of gloss | almost no loss of gloss |

EXAMPLE 3

Comparison Example without the Use of a Sulfonamide in accordance with the present Invention A urea resin solution is prepared as described in Example 1, but without the addition of p-toluenesulfonamide. The urea resin solution is used for impregnating and coating a carrier web, consisting of a white pigmented, absorbent, refined-pulp paper with a weight per unit area of 120 g/m². The weight of the resin-treated carrier paper web is 270 g/m² and the volatile content is 6.5%, the volatile content again being the loss in weight suffered by the resin-treated carrier web as it is dried for 10 minutes at 160° C.

For comparison, the paper carrier web is treated with the urea-resin solution, described in Example 1, the weight of the resin-treated carrier web also being 270 g/m² and the content of volatile components being 6.5%. In both cases, the hardener solution described in Example 1 is used as the hardener. In addition to the 2 parts by weight of hardener solution, based on 100 parts by weight of resin solution, 2 parts by weight of a commercial release agent, based on mineral oil, are added (100% actives).

Both resin-treated paper carrier webs are used for coating 16 mm chipboard, the pressing conditions being selected as described in Example 1.

It is noticeable that the resin-treated paper carrier web of this example has a strong tendency to absorb moisture from the atmosphere. At high relative humidities, the resin-treated paper carrier webs, cut to size and stacked, partially adhere to one another after about one week. This property does not arise in the case of carrier webs which are treated with a urea-resin solution prepared according to Example 1. In addition, the water-vapor stability and the acid values turn out to be inferior in the case of chipboards coated with paper carrier webs which have been treated with a solution of urea resin, prepared without the inventive use of p-toluenesulfonamide.

The properties of the coated chipboards are given in the following table.

of the reaction mixture changes to 8. The batch is heated to 90° C. and left at this temperature with good stirring. Within 10 minutes, the pH of the reaction medium has dropped to 5.8. By the further addition of 8 g (120 m-moles) of a 25% aqueous solution of ammonia, the pH is again displaced into the weakly alkaline region. After a further 10 minutes, the reaction mixture has a viscosity of 60 cps, measured at 20° C.

To the reaction mixture, 3 g (6 m-moles) of a 20% aminosulfonic acid solution are now added. The pH of the reaction mixture changes to 3.8 and is raised to 4.4 by the addition of 3 g (45 m-moles) of a 25% aqueous solution of ammonia. The reaction is now continued for a further 20 minutes at a temperature of 90° C. The batch then has a viscosity of 90 cps at 20° C. and a pH of 5.2. The reaction mixture is cooled for a brief period, mixed with 30 g (0.5 moles) of urea and 25 g (370 m-moles) of a 25% aqueous solution of ammonia, as a result of which a pH of 6.5 at 85° C. is obtained in the reaction mixture. The temperature is increased to 90° C. and the batch is reacted for a further 20 minutes at this temperature. The subsequently cooled resin has a neutral pH and a viscosity of 95 cps. As mentioned above, 35 g of a 50% aqueous dispersion of the above-described copolymer are added with good stirring to one batch (B).

Each time, 100 parts by weight of the urea resin solution are intensively mixed with 1 part by weight of the

TABLE TO EXAMPLE 3

| Resin-treated carrier web | without p-toluenesulfonamide | | | with p-toluenesulfonamide (according to present invention) | | |
|---|---|---|---|---|---|---|
| Pressing time in seconds | 90 | 120 | 180 | 90 | 120 | 180 |
| Acid value (0.1N HCl) | 3 | 3 | 2-3 | 2 | 1 | 1 |
| Surface grade (degree of gloss 40) | 4 | 3-4 | 3 | 2-3 | 2 | 1-2 |
| Tear susceptibility (evaluation according to DIN 53 799 | 1 | 1 | 2 | 0 | 0 | 0 |
| Behavior towards: | | | | | | |
| Water vapor | severe attack (raised paper fibers) | average attack | slight attack | slight loss of gloss | very slight loss of gloss | almost no loss of gloss |

EXAMPLE 4

Comparison Trial without the Addition of Polymer, with Subsequent Addition of Polymer as well as with Addition of Different Amounts of Polymer to Step (a) of the Process of the Present Invention A 2-liter, 4-neck flask, equipped with thermometer, reflux condenser and a device for continuously measuring the pH, is charged with 584 g (7.2 moles) of a 37% formalin solution as well as 1 g (2 m-moles) of a 20% solution of aminosulfonic acid. A 50% dispersion of a copolymer of butyl acrylate and acrylamide, in a weight ratio of 95:5 is now added to prepare several batches of urea resin solution, each having a different copolymer content. In so doing, 8.4 g, 16.5 g, 33 g and 50 g of a 50% copolymer solution were added to batches C, D, E and F. To two batches (A and B), no copolymer is added at this time. In the case of batch B, the copolymer is added at the end of the resin synthesis.

At this time, 33 g of p-toluenesulfonamide and 8 g (120 m-moles) of a 25% aqueous solution of ammonia, as well as 210 g (3.5 moles) of urea are added. The pH hardener solution prepared in Example 1 and 0.5 parts by weight of a release agent, based on mineral oil (100% actives). A white pigmented, absorbent, refined-pulp paper, with a weight per unit area of 100 g/m², is treated with resin by conventional procedures in such a way, that an impregnated and coated paper carrier web results which has a weight of 220 g/m² and a volatiles content, measured as the loss in weight when heated for 10 minutes at 160° C., of 6.5%. The resin-treated carrier web is used for coating the surface of a 16 mm chipboard. The pressing conditions are similar to those described in Example 1.

The properties of the coated chipboards are given in the following table. Sample A is prepared using a urea resin without the addition of copolymer, Sample B using a urea resin with the addition of 4 parts by weight of copolymer solution after the resin synthesis. Resins of Samples C, D, E and F contain 1, 2, 4 and 6 parts by weight of copolymer solution, based on the liquid resin and added in accordance with the invention at the beginning of the resin synthesis.

TABLE FOR EXAMPLE 4

| Resin-treated Carrier Web Pressing time in seconds | Sample A Without Addition of Polymer 120 | Sample B Subsequent Addition 120 | according to the Invention | | | |
|---|---|---|---|---|---|---|
| | | | Sample C 120 | Sample D 120 | Sample E 120 | Sample F 120 |
| Acid value (0.1 N HCl) | 3-4 | 4 | 3 | 2-3 | 1 | 2-3 |
| Surface Grade (degree of gloss 40) | 4 | 4 | 4 | 3-4 | 2 | 3 |
| Tear susceptibility (evaluation according to DIN 53 799) | 2 | 0 | 2 | 1 | 0 | 0 |
| Behavior towards: | | | | | | |
| Water vapor | average loss of gloss | severe attack (paper fiber adheres in the press) | average loss of gloss | average loss of gloss | very slight loss of gloss | slight loss of gloss |

EXAMPLE 5 (In accordance with the Invention)

The urea resin from Example 1 is used for the resin treatment of an absorbent, refined-pulp paper, provided with a wood decor (teak) print and having a weight per unit area of 80 g/m². The impregnation and coating of the printed paper carrier is carried out in the usual manner. The final weight of the resin-treated carrier web is 195 g/m². The volatile content, measured as the loss in weight after a 10 minute treatment at 160° C., is approximately 6%. The resin-treated, decorative paper carrier web is used for coating a chipboard. It is processed in a multi-daylight press under the conditions described in Example 1. The pressing time was 4 minutes. The surface of the coated chipboard is closed and has a uniform gloss. The transparency of the resin layer is very good. No cloudiness whatsoever can be detected in the surface. In the tear test according to DIN 53 799, grade 0 is attained.

What is claimed is:

1. A process for the preparation of solutions of hardenable urea-formaldehyde resins for impregnating and coating carrier webs for coating the surface of wood-based panels, in which an aqueous solution of:
   (a) urea and formaldehyde, in a molar ratio of 1:1.5 to 2.5 and in the presence of 0.2 to 1.0 mmoles of an amino-sulfonic acid and 20 to 100 mmoles of ammonia or 5 to 25 mmoles of urotropine, all amounts being based on 1 mole of urea, are reacted for 10 to 30 minutes at temperatures of 70° to 95° C. until the 50% solution has a viscosity of 55 to 65 cps at 20° C.; and then
   (b) adding 0.8 to 10 mmoles of an aminosulfonic acid and maintaining the pH at a value between 4.0 and 4.5 with ammonia during a reaction time of 10 to 25 minutes at 70° to 95° C. until the 50% solution has a viscosity of 80 to 110 cps at 20° C., and finally;
   (c) adding 40 to 200 mmoles of ammonia or 10 to 50 mmoles of urotropine and 0.1 to 0.3 moles of urea to the reaction product from step (b) and heating the reaction mixture at a temperature of 70° to 95° C. for 5 to 45 minutes until the 50% solution has a viscosity of 85 to 125 cps at 20° C.; and wherein 1 to 10 weight percent, based on the solid resin, of a polymer are added in the form of an emulsion or suspension to the reaction mixture in step (a), the polymer being formed from monomers of the formula

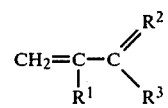

in which
$R^1 = H$ or $CH_3$,
$R^2 = O$,
$R^3 = OH$, $NH_2$, $OC_nH_{2n+1}$ wherein n is a whole number from 1 to 4, $OC_mH_{2m}OH$ wherein m is a whole number from 1 to 6, $OC_mOC_nH_{2n+1}$, or $R^2$ and $R^3$ are both N.

2. The process of claim 1 wherein 1 to 10 weight percent, based on the solid resin, of a sulfonamide of the general formula

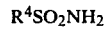

are added to the reaction mixture, $R^4$ being an alkyl, or aryl or alkylaryl residue.

3. The process of claim 2 wherein the sulfonamide is added before or during step (a).

4. The process of claims 1 or 2 wherein 0.1 to 3.0 weight percent, based on the solid resin, of a latent hardening catalyst of the formula

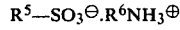

wherein $R^5$ is an alkyl, aryl or alkaryl residue and $R^6$ is an alkyl residue with 1 to 4 carbon atoms, are added to the solution of urea-formaldehyde resin.

5. A solution of a hardenable urea-formaldehyde resin prepared by the process of claim 1.

6. A carrier web coated with a solution of the hardenable urea-formaldehyde resin of claim 5.

* * * * *